(12) United States Patent
Bross et al.

(10) Patent No.: US 6,967,960 B1
(45) Date of Patent: Nov. 22, 2005

(54) METHOD AND APPARATUS FOR EMULATING A LOCAL DATA PORT

(75) Inventors: Kevin W. Bross, Beaverton, OR (US); Monte G. Johnson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/540,785

(22) Filed: Mar. 31, 2000

(51) Int. Cl.[7] .......................... H04L 12/28; G06F 15/16
(52) U.S. Cl. ................. 370/410; 370/395.53; 370/426; 709/219
(58) Field of Search ................................ 370/466, 352, 370/354, 473, 400, 389, 392, 410, 395.53; 709/238, 250, 230, 208, 203, 204, 223, 224, 709/227, 237; 710/64; 379/201.01, 88.17

(56) References Cited

U.S. PATENT DOCUMENTS

| 5,249,290 | A | * | 9/1993 | Heizer ........................ 718/105 |
| 5,299,314 | A | * | 3/1994 | Gates .......................... 710/64 |
| 5,550,957 | A | * | 8/1996 | Davidson et al. .......... 358/1.15 |
| 5,600,793 | A | * | 2/1997 | Nord ........................... 709/230 |
| 6,112,247 | A | * | 8/2000 | Williams .................... 709/236 |
| 6,272,551 | B1 | * | 8/2001 | Martin et al. ............... 709/250 |
| 6,279,035 | B1 | * | 8/2001 | Brown et al. ............... 709/224 |
| 6,366,583 | B2 | * | 4/2002 | Rowett et al. .............. 370/401 |
| 6,421,730 | B1 | * | 7/2002 | Narad et al. ................ 709/236 |
| 6,798,873 | B2 | * | 9/2004 | Vardi et al. ............ 379/201.01 |
| 6,816,544 | B1 | * | 11/2004 | Bailey et al. ............... 375/222 |

* cited by examiner

*Primary Examiner*—Hanh Nguyen
(74) *Attorney, Agent, or Firm*—Blakely, Sokoloff, Taylor & Zafman LLP

(57) ABSTRACT

A method for receiving a signal from a local device and converting the signal to a network port packet data signal to emulate a local data signal port. Once the signal from the local device is converted to the network port packet data signal, the network port packet data signal is transmitted to a remote device over a network connection.

13 Claims, 6 Drawing Sheets

METHOD AND APPARATUS FOR EMULATING A LOCAL DATA PORT

FIELD OF THE INVENTION

The present invention relates to the field of computer system networking. More specifically, the present invention relates to how data is communicated among network devices.

BACKGROUND OF THE INVENTION

As technology moves toward faster utilization of devices, multifunction devices (MFDs), such as printer/fax/scanner devices, printers, and scanners, communication between the devices and computers becomes important. Additionally, the devices are being networked to provide utilization of the a limited number of devices by several computers at any given time. However, devices that are locally connected communicate differently compared to devices that are networked.

Networking several computers with devices reduces the capabilities of two way communication of data between the computers and the devices because of the way data is communicated through networking. Local communication of data between computers and devices provides a more direct two-way communication of data between computers and the devices.

A typical method for networking devices, such as printers, involves using a device server port monitor software to redirect device requests across the network. In other cases, a network driver allows printer ports to be redirected. In most situations, the printer driver sends the printing data to the port monitor or network redirection layer. The port monitor and layers below are responsible for ensuring the job is properly printed (the printer driver has totally completed its job and given the data to the port monitor).

Some device drivers bypass the port monitor interface and write directly to a communication layer. This allows for more direct manipulation of the device, but it usually means that the device can no longer be networked. As more people try to network these devices, the approach of bypassing the port monitor interface and writing directly to the communication layer becomes increasingly difficult. This approach is made even worse when device drivers bypass the communication layer entirely and send device data directly to the parallel port hardware, such as the Super I/O chip in the computer. If communication like this is required, the printer cannot be networked.

Additionally, if a device is networked, communication between more than one computer and the networked device is difficult due to the device being busy receiving a request from one of the computers. The other computers on the network must wait until the receiving of data by the networked device is complete.

Because of communicating locally is different from communicating across a network, devices for the network cannot be locally connected and local devices cannot be networked without difficulty.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Figure 1:
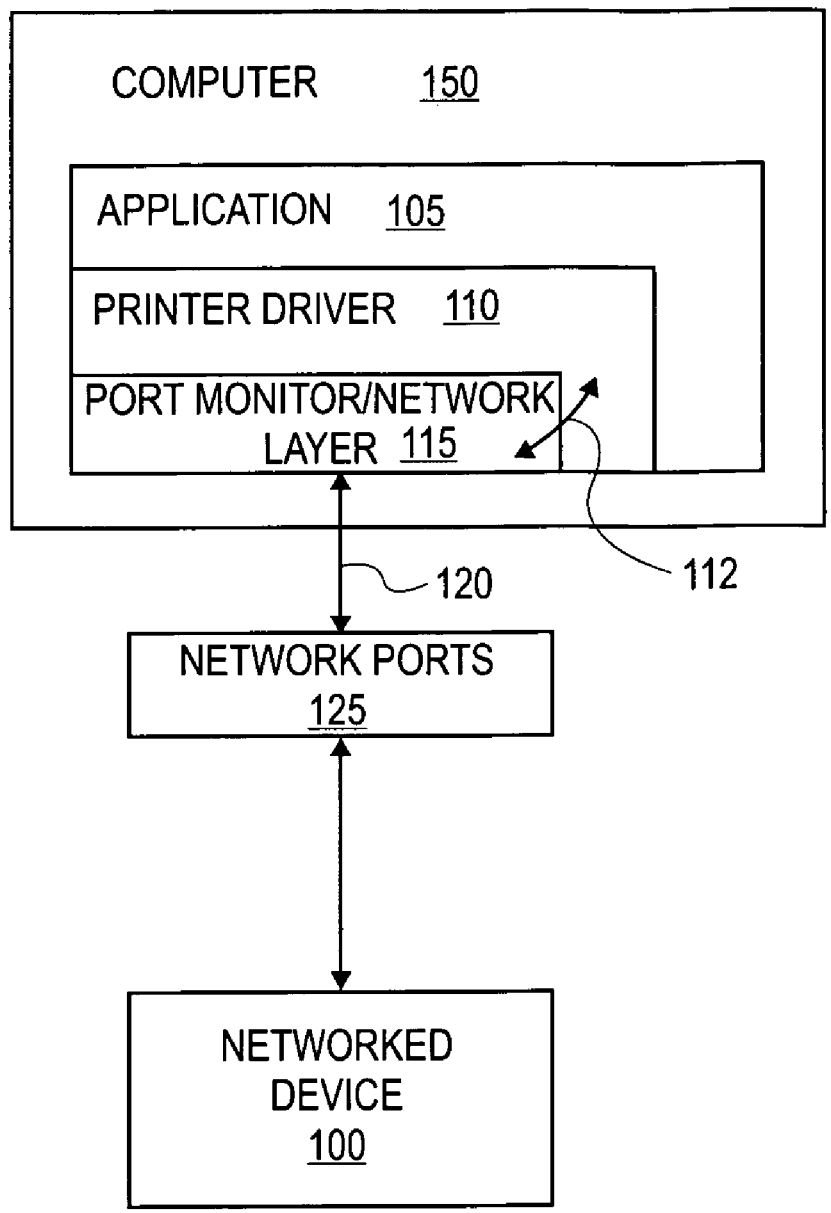
FIG. 1 illustrates an example of network communications with a printer device.
Figure 2:
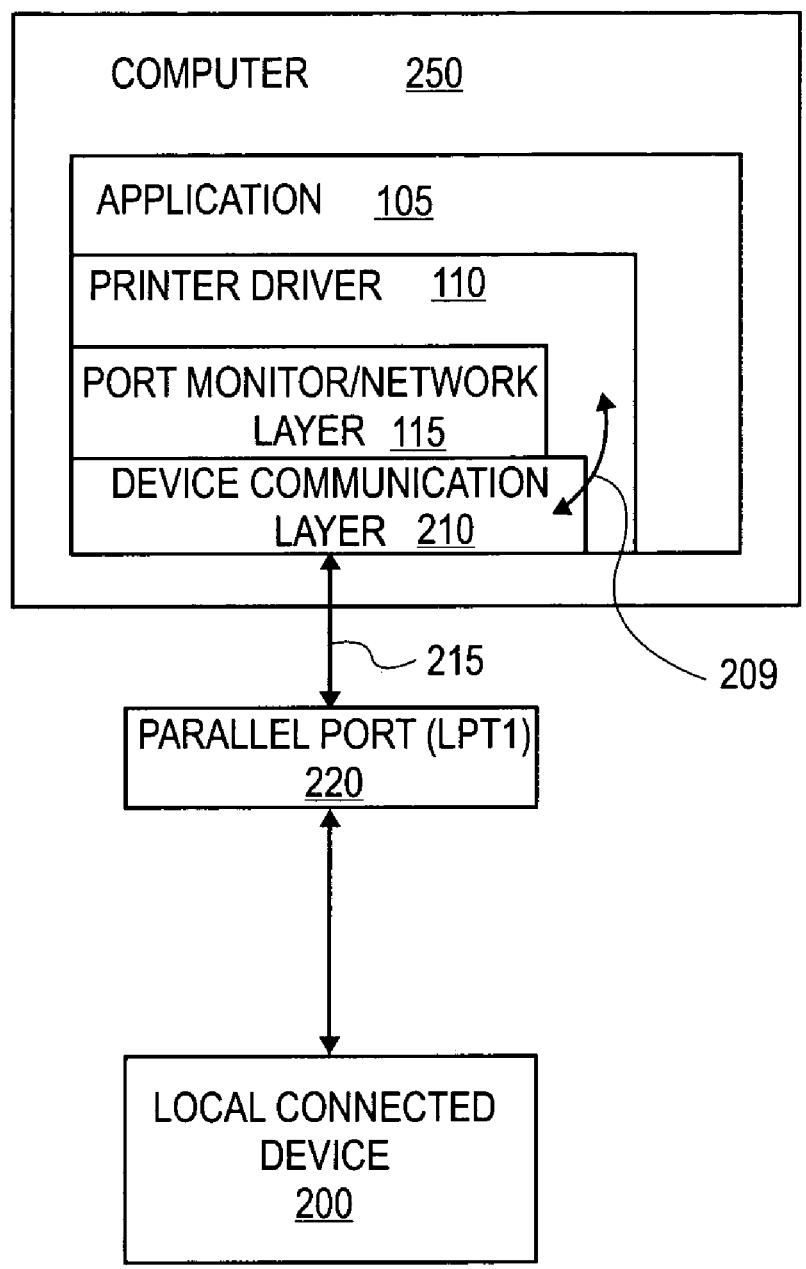
FIG. 2 illustrates an example of communication and manipulation of a local device.

FIGS. 1 and 2 illustrate a prior art embodiment for network data communications and a prior art embodiment of local data communications.

FIG. 1 illustrates an example of network communications with a printer device, however, it should be appreciated that any other type of networked device known in the art such as, but not limited to, a multifunctional device (MFD) can be used. Illustrated in FIG. 1, is an example of a computer with an operating system application such as, but not limited to, the Windows® operating systems, available from Microsoft Corporation of Redmond, Wash. Alternate embodiments may be implemented in other programming approaches known in the art.

In FIG. 1, a computer 150 is running an application 105. Incorporated in the application 105 is a device driver 110 which facilitates the sending of data to a networked device 100. The device driver 110 incorporates a port monitor/network layer 115. The port monitor/network layer 115 facilitates redirection of local device data across the network through the network port 125 to the networked device 100. In the illustrated prior art of FIG. 1, the device driver 110 sends a signal 112 to the port monitor/network layer 115 (i.e., a command signal to generate network packet data signals). The port monitor/network layer 115 is responsible for ensuring that the device data is properly executed by converting the local device data into network port packet data signals 120 for transmission onto the network (i.e., the device driver 110 completes sending the printing data to the port monitor/network 115). The network port packet data signals 120 are sent through the network port 125 to the networked device 100, which is connected to a network (not shown).

Due to communicating through a network using network port packet data signals, communications between the computer 150 and the networked device 100 is unreliable and not direct. Even though networking the device allows for more than one user to utilize the networked device, networking the device does not allow for direct communication between the computer and the device.

FIG. 2 illustrates an example of communication and manipulation of a local device. In FIG. 2, a computer 250 is running the operating system application 105 with the device driver 110. In addition to the port monitor/network layer 115, the device driver 110 incorporates a device communication layer 210. In the illustrated prior art of FIG. 2, the device driver 110 sends a signal 209 to the device communication layer 210 (i.e., a command signal to generate local port pin data signals). When sending device data, the device communication layer 210 allows the device driver 110 to bypass the port monitor/network layer 115 and send local device data to a local device 200 directly through a parallel port 220 such as, but not limited to, a line print terminal (LPT1). The device communication layer converts local device data into local port pin data signals 215.

Due to communicating through a direct link using local port pin data signals, communicating between the computer 250 and the local device 200 is reliable and direct. Even though utilizing the device communication layer 210 to send local device data as local port pin data signals through the parallel port 220 allows for more direct and reliable communication and manipulation of the local device 200, utilizing the device communication layer 210 does not permit the local device 200 to be networked and shared by other users.

The present invention emulates local port communication of data on a network to allow for one mode of communication (i.e., parallel port communication) be used for both a locally connected device and a networked device, thereby, improving two-way communication of data between devices, while utilization of a device by several users.

Figure 3:
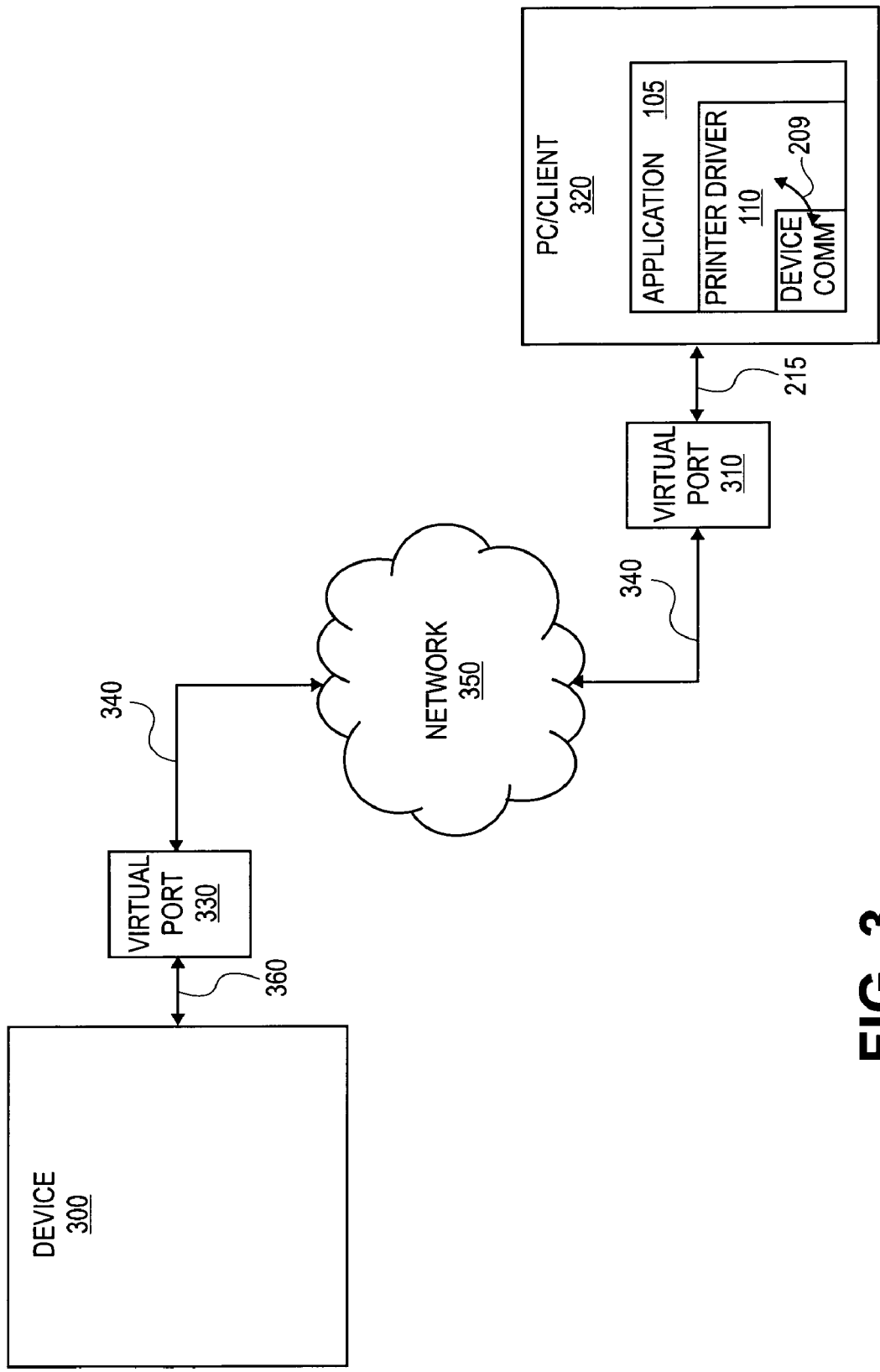
FIG. 3 illustrates one embodiment of the present invention for facilitating emulation of local data communications between networked devices.

FIG. 3 illustrates one embodiment of the present invention for facilitating emulation of local data communications between networked devices. In FIG. 3, a computer 320 is running the application 105, and incorporated in the application is the device driver 110. The device driver 110 incorporates a device communication layer 210 for converting local device data into local port pin data signals 215.

Shown in FIG. 3, the device driver 110 sends a signal 209 to the device communication layer 210 (i.e., a command signal to generate local port pin data signals). The local port pin data signals 215 are received by a computer virtual port 310 in accordance with the teachings of the present invention. The computer virtual port 310 is a network port that emulates a local port (i.e., a parallel port such as, but not limited to, a line print terminal). That is, the virtual port 310 converts the local port pin data signals 215 to network port packet data signals 340 for transmission onto the network 350.

Illustrated in FIG. 3, the network port packet data signals 340 are routed through the network 350 and received by the networked device 300. Any number of network routing techniques known in the art may be used. Incorporated with the networked device 300 is a device virtual port 330 in accordance with the teachings of the present invention. The device virtual port 330 receives the network port packet data signals 340 from the network 350. Much like the virtual port 310, the device virtual port 330 is a network port that emulates a local port based upon the signal received from the network 350. That is, the device virtual port 330 converts the network port packet data signals 340 to local port pin data signals 360 for sending to the networked device 300.

Additionally, in FIG. 3, information from the networked device 300 such as, but not limited to, status of ink level, paper level, toner level, etc., will be sent as local port pin data signals 215 to the device virtual port 330. Again, the virtual port 330 emulates a local port such as, but not limited to, a LPT1. The device virtual port 330 converts the local port pin data signals 360 to network port packet data signals 340 for transmission on to the network 350.

The computer virtual port 310 receives the network port packet data signals 340 from the network 350. Much like the virtual port 330, the computer virtual port 410 emulates a local port based upon the signal received from the network 350. That is, the computer virtual port 310 converts the network port packet data signals 340 to local port pin data signals 215 for sending to the computer 320, where the computer 320 will receive the information from the networked device 300 such as, but not limited to, status of ink level, paper level, toner level, print head temperature, etc.

As shown in FIG. 3, a networked device can communicate with a computer as if the device and the computer were locally connected, thereby, allowing a devices to be networked, while maintaining locally connected data communication capabilities between the networked devices.

FIG. 3 illustrates one embodiment showing the present invention, virtual ports 330 and 310, as components outside of the devices 300 and 320. In an alternate embodiment, the functionality of the present invention, virtual ports 310 and 330, may be executed as software within the devices 300 and 320.

Figure 4:
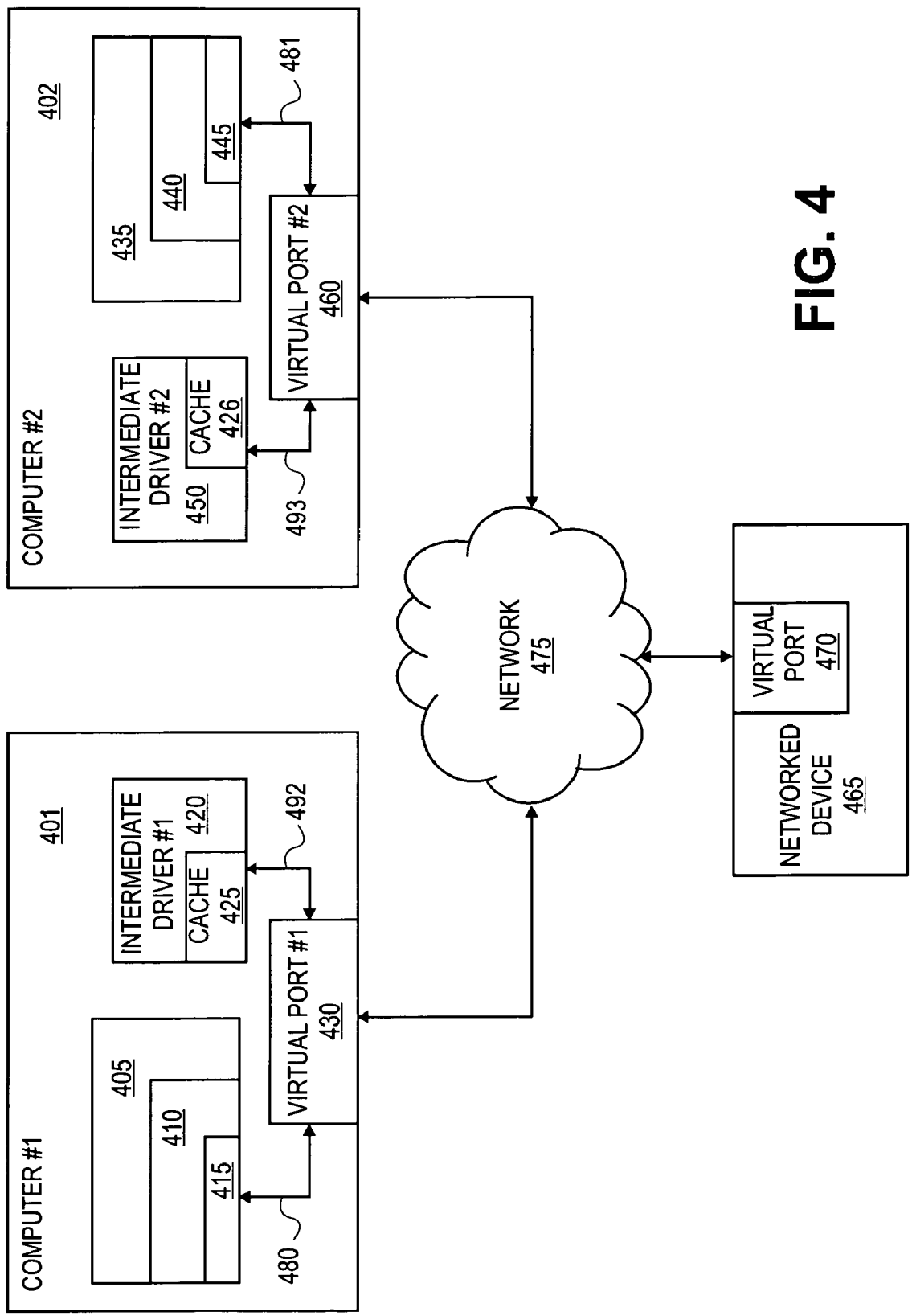
FIG. 4 illustrates one embodiment of the present invention for facilitating local data communications between two networked devices.

FIG. 4 illustrates one embodiment of the present invention for facilitating local data communications between two networked devices. In FIG. 4, both computer #1 401 and computer #2 402 are each running an operating system application 405 and 435. Incorporated in each operating system application 405 and 435 is a device driver 410 and 440. Each device driver 410 and 440 incorporates a device communication layer 415 and 445 for converting local device data into local port pin data signals 480 and 481. Additionally, incorporated in each computer 401 and 402, is a virtual port 430 and 460 and an intermediate device driver 420 and 450. Each intermediate driver 420 and 450 includes a cache memory 425 and 426.

In FIG. 4, before the start of a device request, virtual port #1 430 retrieves device status such as, but not limited to, toner level, paper level, etc., from the networked device 465 before computer #1 401 sends a device request. Since the retrieved data is achieved through the virtual port #1 430 and device virtual port, as discussed above with reference to FIG. 3, the communication between the intermediate driver #1 420 and the networked device 465 will be as if communicating locally, even though the communication is through a network 475. The retrieved data is stored in the cache memory 425 of the intermediate driver #1 420. Once the retrieved data is stored, computer #1 401 sends a device request such as, but not limited to, a print request to the networked device 465. Since a local port connection is being emulated, networked device 465 will be unavailable to other networked devices, while servicing the device request from computer #1 401.

Illustrated in FIG. 4, before the device request of computer #1 401 is complete, computer #2 402 sends a device request to the networked device 465 through the virtual port

2 460 emulating a second local port connection. When the device request of computer #2 402 reaches the device virtual port 470, the device virtual port refuses the connection because only one local port connection can be serviced at a time. Virtual port 470 sends a busy signal with the internet protocol (IP) address of the occupying computer (computer #1 401) back to the virtual port #2 460.

Once the busy signal and the IP address are received by virtual port #2 460, virtual port #2 460 can send a request along with the IP address to the intermediate driver #2 450 to retrieve the information stored in the cache memory 425 of intermediate driver #1 420 through the network 475. In response to the request, the intermediate driver #2 450 retrieves the information from the intermediate driver #1 420. In other words, information about a first networked device, such as, but not limited to, paper level, toner level, ink level, print head temperature, busy status, etc., may be communicated to one or more additional networked devices even though the first networked device may be busy with an emulated local request.

Figure 5:
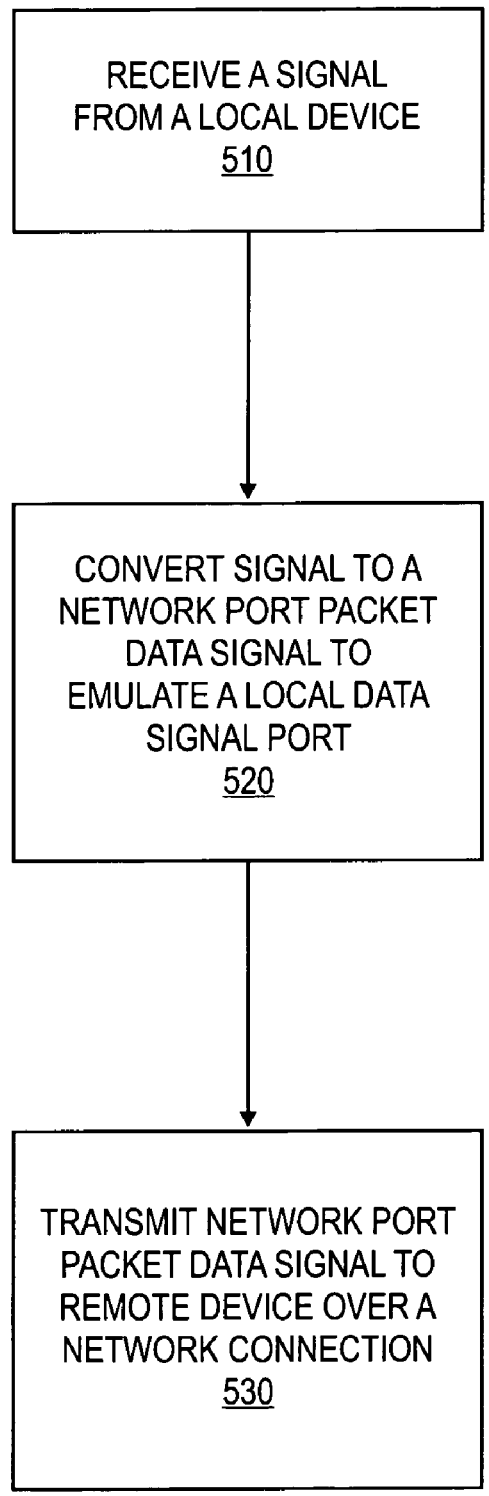
FIG. 5 is a flow chart illustrating a method for emulating a local data port according to one embodiment of the present invention.

FIG. 5 is a flow chart illustrating a method for emulating a local data port according to one embodiment of the present invention. A signal is received from a local device such as, but not limited to, a computer 510. The signal is converted to a network port packet data signal to emulate a local data signal port 520. The network port packet data signal is transmitted to a remote device over a network connection 530.

Figure 6:
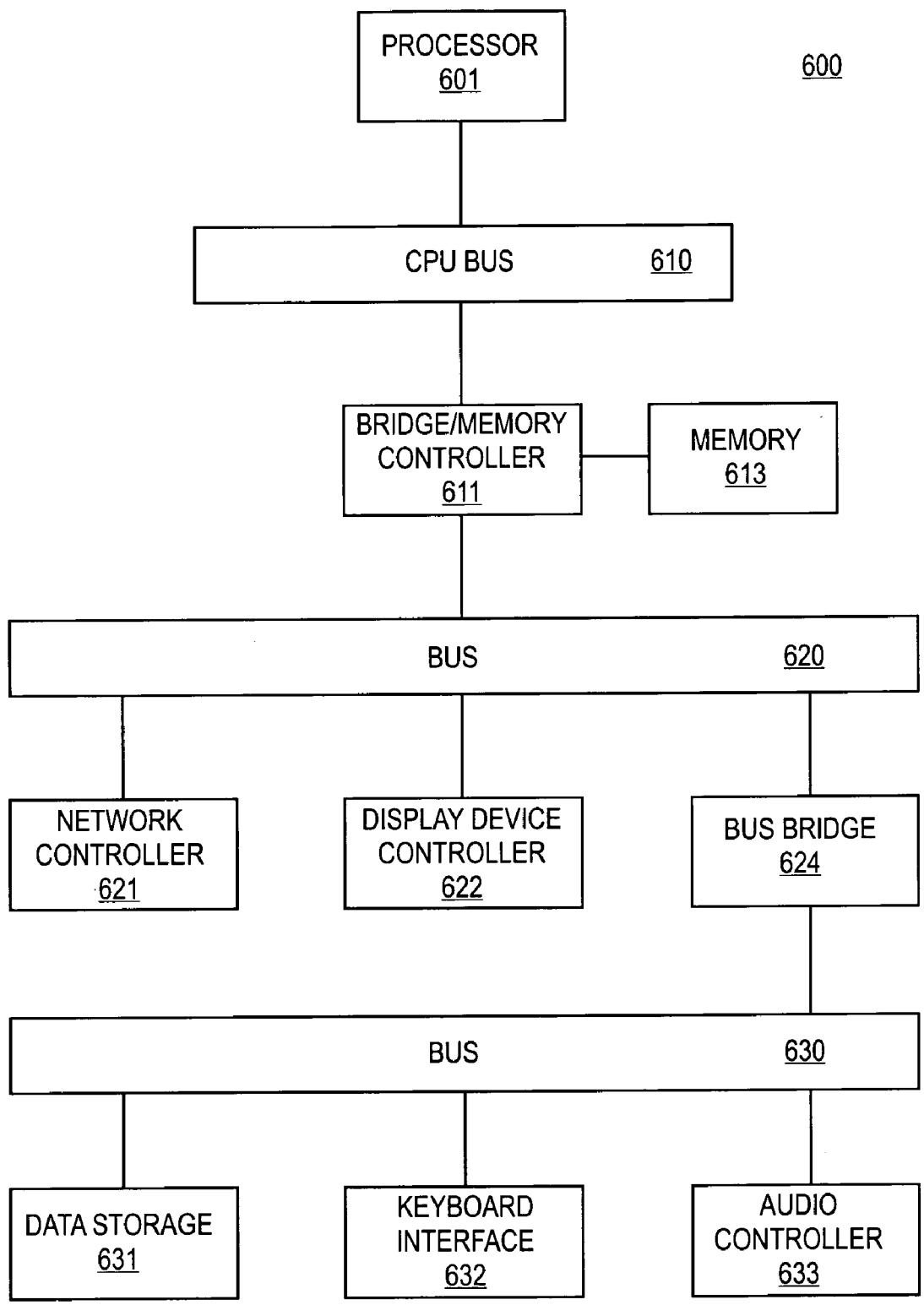
FIG. 6 illustrates a computer system upon which an embodiment of the present invention can be implemented.

FIG. 6 illustrates a computer system 600 upon which an embodiment of the present invention can be implemented. The computer system 600 includes a processor 601 that processes data signals. The processor 601 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 6 shows an example of the present invention implemented on a single processor computer system 600. However, it is understood that the present invention may be implemented in a computer system having multiple processors. The processor 601 is coupled to a CPU bus 610 that transmits data signals between processor 601 and other components in the computer system 600.

The computer system 600 includes a memory 613. The memory 613 may be a dynamic random access memory (DRAM) device, a synchronous direct random access memory (SDRAM) device, or other memory device. The memory 613 may store instructions and code represented by data signals that may be executed by the processor 601.

A bridge/memory controller 611 is coupled to the CPU bus 610 and the memory 613. The bridge/memory controller 611 directs data signals between the processor 601, the memory 613, and other components in the computer system 600 and bridges the data signals between the CPU bus 610, the memory 613, and a first I/O bus 620.

The first I/O bus 620 may be a single bus or a combination of multiple buses. As an example, the first I/O bus 620 may comprise a Peripheral Component Interconnect (PCI) bus, a Personal Computer Memory Card International Association (PCMCIA) bus, a NuBus, or other buses. The first I/O bus 620 provides communication links between components in the computer system 600. A network controller 621 is coupled to the first I/O bus 620. The network controller 621 links the computer system 600 to a network of computers (not shown in FIG. 6) and supports communication among the machines. A display device controller 622 is coupled to the first I/O bus 620. The display device controller 622 allows coupling of a display device (not shown) to the computer system 600 and acts as an interface between the display device and the computer system 600. The display device controller 622 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 601 through the display device controller 622 and displays the information and data signals to the user of the computer system 600.

A second I/O bus 630 may be a single bus or a combination of multiple buses. As an example, the second I/O bus 630 may comprise a PCI bus, a PCMCIA bus, a NuBus, an Industry Standard Architecture (ISA) bus, or other buses. The second I/O bus 630 provides communication links between components in the computer system 600. A data storage device 631 is coupled to the second I/O bus 630. The data storage device 631 may be a hard disk drive, a floppy disk drive, a CD-ROM device, a flash memory device or other mass storage device. A keyboard interface 632 is coupled to the second I/O bus 630. The keyboard interface 632 may be a keyboard controller or other keyboard interface. The keyboard interface 632 may be a dedicated device or can reside in another device such as a bus controller or other controller. The keyboard interface 632 allows coupling of a keyboard (not shown) to the computer system 600 and transmits data signals from a keyboard to the computer system 600. An audio controller 633 is coupled to the second I/O bus 630. The audio controller 633 operates to coordinate the recording and playing of sounds.

A bus bridge 624 couples the first I/O bus 620 to the second I/O bus 630. The bus bridge 624 operates to buffer and bridge data signals between the first I/O bus 620 and the second I/O bus 630.

In one embodiment, the virtual port, as described above, is implemented using one or more computers such as the computer system of FIG. 6. In one embodiment, the present invention is implemented as software routines executed by one or more execution units within the computer(s). For a given computer system, the software routines can be stored on a storage device, such as memory 613.

In one embodiment, the software routines are written in the C programming language. It should be appreciated that the software routine may be implemented in any of a wide variety of programming languages. In alternate embodiments, the present invention is implemented in discrete hardware or firmware. For example, one or more application specific integrated circuit (ASICs) could be programmed with one or more of the above described functions of the device server. In another example, one or more functions of the device server could be implemented in one or more ASICs on additional circuit boards, and the circuit boards could be inserted into the computer(s) described above. In another example, field programmable gate arrays (FPGAs) or static programmable gate arrays (SPGAs) could be used to implement one or more functions of the present invention. In yet another example, a combination of hardware and software could be used to implement one or more functions of the present invention.

Thus, a method and apparatus for emulating network and local ports and network and local port signals is described.

In the forgoing description, the invention is described with reference to specific exemplary embodiments thereof. It will, however, be evident that various modifications and changes may be make thereto without departing from the broader spirit and scope of the present invention as set forth in the appended claims. The specifications and drawings are accordingly to be regarded in an illustrative rather than in a restrictive sense.

What is claimed is:

1. A method comprising:
receiving a first signal from a local device;
converting the first signal to a first network port packet data signal to emulate a local data signal port on a network data signal port with respect to the local device;
transmitting the first network port packet data signal to a first remote device over a network connection;
receiving a second network port packet data signal from the first remote device over the network connection, the second network port packet data signal including a busy signal indicating the first remote device is busy and an address of a second remote device on the network connection, the first remote device to service the second remote device;
converting the second network port packet data signal to a second signal to emulate the local data signal port with respect to the local device;
transmitting the second signal to the local device;
transmitting a third network port packet data signal to the second remote device to request status information of the first remote device; and
receiving a fourth network port packet data signal from the second remote device including status information of the first remote device.

2. The method of claim 1, further comprising:
receiving a fifth port packet data signal from the second remote device while receiving the second network port packet data signal from the first remote device; and
sending a sixth network port packet data signal to the second remote device including a busy signal and an address of the first remote device on the network connection.

3. The method of claim 1, wherein receiving the first signal comprises receiving a command signal to generate a local port pin data signal.

4. The method of claim 1, wherein receiving the first signal comprises receiving a local port pin data signal.

5. The method of claim 1, wherein the status information of the first remote device includes one or more of a busy status, an ink level, a paper level, a print head temperature, and a toner level.

6. An apparatus comprising:
a first port to receive a first signal from a local device;
a plurality of circuit components coupled to the first port to convert the first signal to a first network port packet data signal to emulate a local data signal port on the first port;
a second port to transmit the first network port packet data signal to a first remote device over a network connection accessible to the second port;
a third port to receive a second network port packet data signal from the first remote device over the network connection, the second network port packet data signal including a busy signal indicating the first remote device is busy and an address of a second remote device on the network connection, the first remote device to service the second remote device;
the plurality of circuit components to further convert the second network port packet data signal to a second signal to emulate the local data signal port;
a fourth port to transmit the second signal to the local device;
a fifth port to transmit a third network port packet data signal to the second remote device to request status information of the first remote device; and
a sixth port to receive a fourth network port packet data signal from the second remote device including status information of the first remote device.

7. The apparatus of claim 6, further comprising:
the sixth port to receive a fifth port packet data signal from the second remote device while receiving the second network port packet data signal from the first remote device; and
the fifth port to transmit a sixth network port packet data signal to the second remote device including a busy signal and an address of the first remote device on the network connection.

8. The apparatus of claim 6, wherein a first port to receive a first signal from a local device comprises the first port to receive a local port pin data signal.

9. The apparatus of claim 6, wherein the status information of the first remote device includes one or more of a busy status, an ink level, a paper level, a print head temperature, and a toner level.

10. An article of manufacture comprising a storage medium having stored therein a plurality of instructions that are machine executable, wherein when executed, cause the machine to perform operations, including:
receiving a first signal from a local device;
converting the first signal to a first network port packet data signal to emulate a local data signal port on a network data signal port with respect to the local device;
transmitting the first network port packet data signal to a first remote device over a network connection;
receiving a second network port packet data signal from the first remote device over the network connection, the second network port packet data signal including a busy signal indicating the first remote device is busy and an address of a second remote device on the network connection, the first remote device to service the second remote device;
converting the second network port packet data signal to a second signal to emulate the local data signal port with respect to the local device;
transmitting the second signal to the local device;
transmitting a third network port packet data signal to the second remote device to request status information of the first remote device; and
receiving a fourth network port packet data signal from the second remote device including status information of the first remote device.

11. The article of manufacture of claim 10, the storage medium further comprising instructions, wherein when executed, cause the machine to perform operations including:
receiving a fifth port packet data signal from the second remote device while receiving the second network port packet data signal from the first remote device; and
sending a sixth network port packet data signal to the second remote device including a busy signal and an address of the first remote device on the network connection.

12. The article of manufacture of claim 10, wherein receiving the first signal comprises receiving a local port pin data signal.

13. The article of manufacture of claim 10, wherein the status information of the first remote device includes one or more of a busy status, an ink level, a paper level, a print head temperature, and a toner level.

* * * * *